United States Patent Office 3,410,534
Patented Nov. 12, 1968

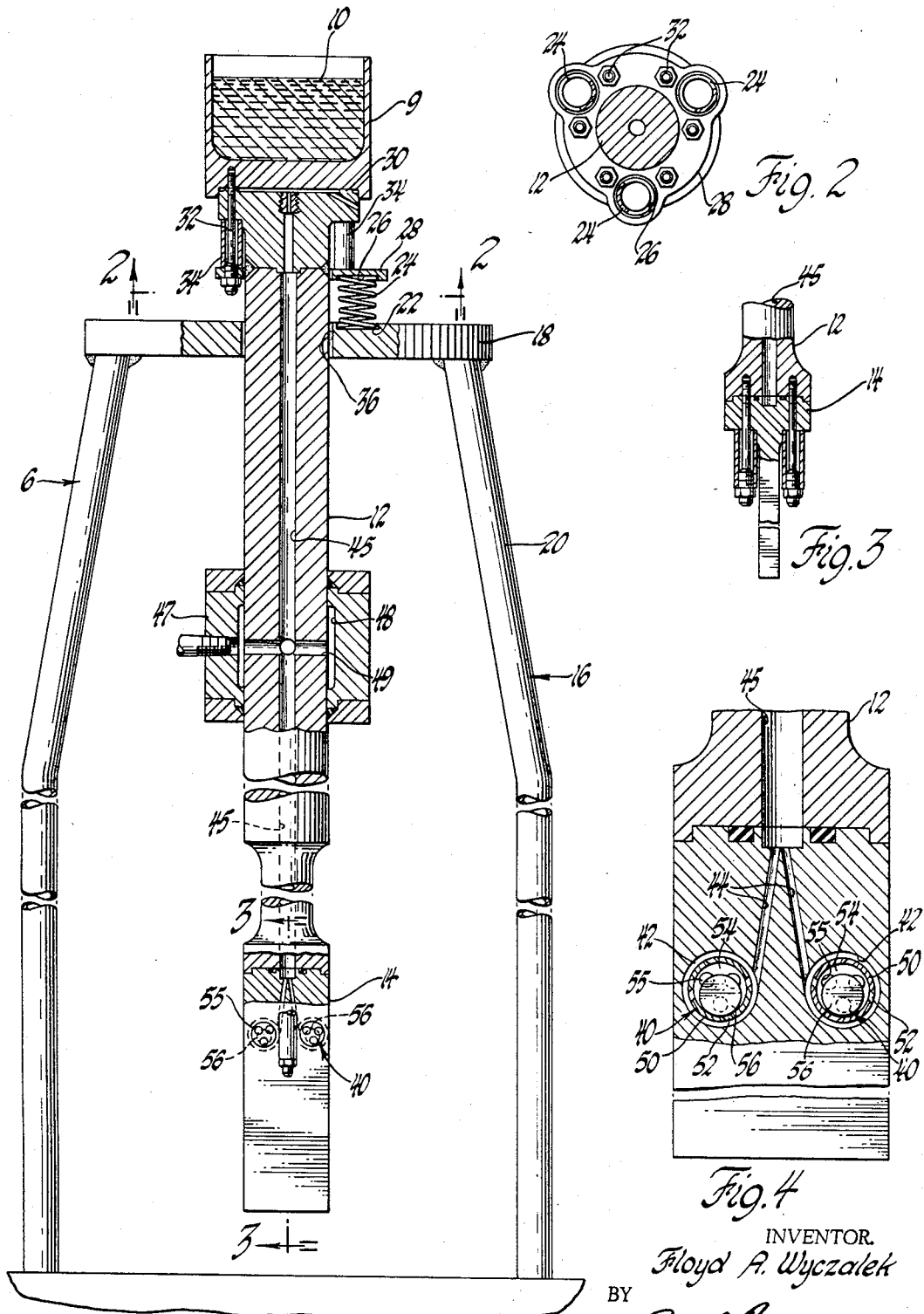

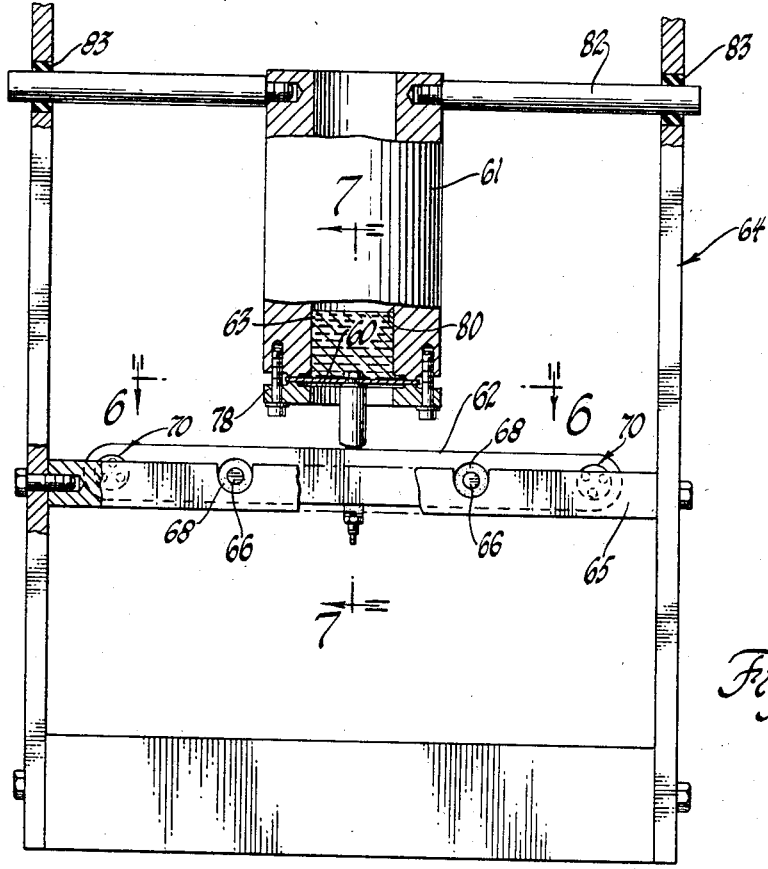
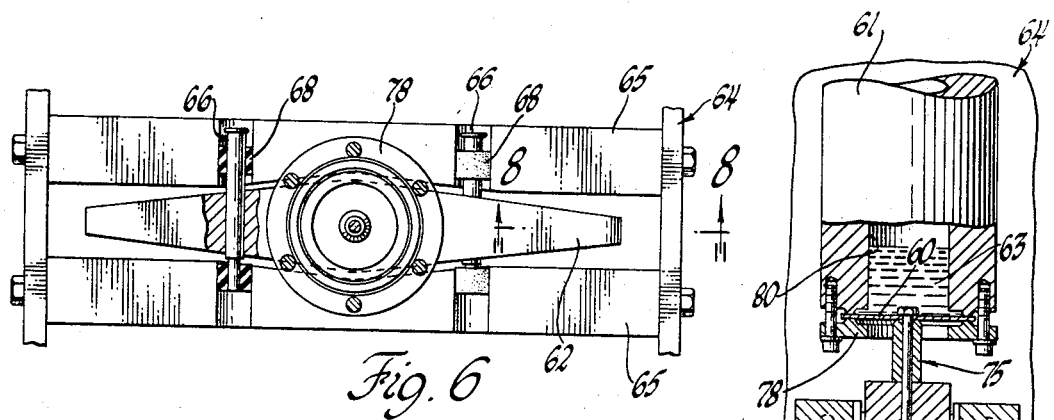

3,410,534
SONIC APPARATUS FOR WETTING METALS
Floyd A. Wyczalek, Birmingham, Mich., assignor to General Motors Corporation, Detroit, Mich., a corporation of Delaware
Filed Mar. 30, 1964, Ser. No. 355,569
11 Claims. (Cl. 259—72)

ABSTRACT OF THE DISCLOSURE

A vibratory apparatus for wetting an oxidized surface of a solid metal with a molten metal. The apparatus includes a sonic wave generator connected through an elastic coupling means to a vessel that holds the molten metal.

---

This invention relates generally to wetting of metals without using a flux and particularly to the use of sonic vibrations to remove the oxide layer on a metallic surface so that a molten metal will wet and adhere to it.

One problem in joining metals is the difficulty of creating a good bond between the solder and the base metal due to the oxide film that characteristically forms. The oxide film is usually dissolved chemically with a flux so that the solder can reach the clean metal surface and adhere to it. In some cases, the presence of an oxide film is of lesser importance since the natural attraction between two metals is great. The wetting of a copper penny with mercury is an example. Between these two extremes however, a flux may or may not be required depending upon various factors.

For example, aluminum alloy surfaces quickly become coated with an oxide film that resists wetting by tin solders. Consequently, in order to join the aluminum surfaces a chemical flux is usually required to dissolve the oxide and float it away from the joint.

It is known that ultrasonic and sonic vibrations may be used to break up oxide layers on metals. A common way of doing this is to randomly vibrate the part to be coated while in contact with the molten metal or vice versa. An explanation of the oxide destruction apparently lies in the fact that there is a mechanical attack of the metal surfaces caused by the collapse of tiny gas bubbles which form at the liquid-solid metal interface. These bubbles tend to grow in local areas of reduced pressure caused by the relative motion of the liquid and solid bodies and collapse with great force against the surface of the base metal causing a break-up and dispersion of the oxide layer by a process called cavitation.

While the present invention uses sonic wave energy to wet metals by cavitation, it is to be distinguished from the generally known methods where a low-powered vibrator shakes the part to be tinned in a random fashion while in contact with solder.

In accordance with this invention, a vessel containing a molten metal, such as a soft solder, is supported as a part of a vibratory system which includes an elastic coupling. A vibrator of given power excites the elastic coupling in a periodic fashion producing a standing wave sonic vibration therein which is transmitted to the vessel exciting the solder bath. Maximum amplitudes are reached as the fundamental frequency of the system is approached. The surface with the oxide layer to be removed is immersed in the solder bath causing vigorous scrubbing and consequent destruction of the oxide layer on the surface followed by wetting. The elimination of the oxide takes place in a matter of seconds without regard to the shape of the part due to the resonant sound field set up in the molten solder bath.

A more complete understanding of the invention may be had by referring to the following description and drawings wherein:

FIGURE 1 is a partial sectional view of a longitudinal column type of apparatus for carrying out the invention;

FIGURE 2 is a view of the upper part of the apparatus shown in FIGURE 1 taken along line 2—2;

FIGURE 3 is a partially sectioned side view of the vibrator end of the apparatus in FIGURE 1 taken along the line 3—3;

FIGURE 4 is an enlargement of the vibrator end of the apparatus shown in FIGURE 1;

FIGURE 5 is a partial sectional view of another form of apparatus for carrying out the invention constructed with a flexural beam;

FIGURE 6 is a top view of the beam element of the apparatus shown in FIGURE 5 taken along the line 6—6;

FIGURE 7 is a partial view in vertical section taken at the center of the flexural beam along the line 7—7 of FIGURE 5; and FIGURE 8 is an enlargement taken along line 8—8 of FIGURE 6 showing one end of the mounted vibrator used to excite the beam.

The apparatus shown in FIGURES 1–4 constitutes a vibratory system 6 made up principally of a crucible or vessel 9 which holds a quantity of molten metal 10 and is supported on the end of a longitudinal bar or column 12 having a vibratory head 14. While a heat source for the crucible is not shown, it should be understood that any suitable heating means to keep the metal liquid may be used. In more detail, the apparatus includes a floor standing frame member 16 having a table portion 18 supported in tripod fashion on legs 20. The table portion 18 has circular recesses 22 in the top which receive the lower end of coil springs 24. The upper ends of the coil springs rest in circular recesses 26 in the under surface of collar 28. The base of crucible 9 rests on an annular ridge 30 formed on the end of longitudinal column 12 and has threaded holes therein to receive bolts 32 which draw the crucible 9 solidly against the end of the column. Spacer sleeves 34 hold the collar 28 rigidly circumjacent the column. Coil springs 24 have a relatively low spring rate to reduce the vibrations transmitted to frame member 16 thus substantially isolating the column from the floor. The column 12 avoids direct contact with the frame 16 being received in the slot 36 which is of larger diameter.

The vibrator head 14 mounted on the lower end of the column includes a pair of counter-rotating, roller-type, vibrators 40 mounted in a vertical plane and on opposite sides of the center line of the column. Each vibrator includes an annular chamber 42 into which air under pressure is admitted from the branch passages 44 in the vibrator head which connect with the axial passage 45 in the column. Air pressure is supplied from a suitable air pressure source at a saddle member 47 having an internal annular distribution chamber 48 communicating with transverse ducts 49 which intercept the axial passage 45 at the nodal location of the column. The nodal location is the area where minimum column motion occurs as will be described.

Referring to FIGURE 4, each vibrator 40 includes a fixed ring 50 having tangential jets 52 connecting chamber 42 with an inner chamber 54 which is exhausted through axial ports 55. The jets are angled in the rings 50 to impinge air on the rollers 56 causing them to roll in opposite directions within the ring 50. Due to the relationship of the two vibrators on opposite sides of the centerline of the column, the force vectors developed in a plane through the vibrator axes will cancel out while those developed perpendicular to such plane will apply an alternating longitudinal force to the column. Synchronization of the rollers occurs as they are driven at a spin frequency approaching the resonant frequency of the system. The masses of the system, as a result of some initial deflection received in a longitudinal direction, are started into a longitudinal vibrational mode so that the column begins to elongate and contract. As the resonant frequency of the column is approached, the elastic deflections of the column become greater and greater until the system vibrates at its maximum amplitude. The column vibrates at what is termed half-wave length vibration, a resonant phenomenon in which the column alternately lengthens and shortens at the ends. The vibrator end of the column moves 180 degrees out of phase with the crucible end with a nodal zone of nearly zero motion at some point between. The nodal zone is the natural location to introduce air for the system as described above.

Each orbiting roller 56 imparts a rotating force to the associated ring 50 which will have a radial component at the point of contact between the roller and the ring. This force component tends to cause the ring to move in a given direction. This movement is transmitted to the vibrator head 14 and the column 12. The rollers 56 rotate about their center of gravity and at the same time, perform a circular planetary or orbital movement within the ring. As each roller moves in an orbital fashion, a step-up in frequency occurs which provides a number of force impulses greater than one for each complete revolution of the roller about its own center. This feature of the vibrator is fully explained in U.S. Patent 2,194,410 and reference is made thereto for a complete understanding of the design principles involved in obtaining the frequency step-up.

While the column 12 may normally be thought of as a rigid member, it has elasticity in the longitudinal direction and if periodically excited with sufficient power, will develop a standing-wave vibration under given conditions in which it will elastically elongate and contract at the ends with considerable amplitudes and accelerations as the fundamental frequency is approached. Each vibrator shown has a 100 pound force rating at 1000 cycles per second and will produce an acceleration sound field in the empty crucible of well over a thousand times the acceleration of gravity. Naturally, the vibratory system views molten metal as a dissipative medium and, as a result, the acceleration levels will be lower when the molten metal is present. However, in spite of the resistive detuning with molten metal, there is more than sufficient activity to produce wetting. For example, incipient wetting occurs at about 10 seconds for die cast aluminum immersed in pure tin solder at 590° F. with acceleration levels of about 100 g's. Of course, the condition of the oxide layer, type of wetting metal, the power of the vibrators, and the resonant frequency characteristics of the system will all be factors which will be considered for any particular case. As a rule, the lower the natural frequency of the system, the longer immersion time required at a given acceleration level.

In operation the molten metal bath 10 is heated at a predetermined temperature above its melting point and the part to be treated is immersed therein until its temperature is nearly the same as that of the bath 10. Then the vibrators are started and the system is brought to the resonance range almost immediately. A strong acceleration sound field is produced in the molten metal 10 and a super cavitation effect is immediately produced which disintegrates the oxide on the part and disperses it through the bath leaving the bare metal surfaces underneath which are readily wet by the molten metal 10, usually a soft soldering alloy. Since the liquid metal is vibrating as part of the resonant system, the configuration of the part has relatively little effect on the uniformity of cavitation. In other words, parts having holes or reentrant angles are scrubbed nearly as effectively as would be a round bar or some other uniformly shaped part. It is preferred that the acceleration level be above 100 g's since shortened immersion times are obtained for any given frequency.

Referring to FIGURES 5 through 8, another form of apparatus for carrying out the invention is shown and includes as the major elements, a flexible diaphragm 60, a reaction mass cylinder 61, both of which define a vessel for holding the molten metal 63, and a free-free beam 62 which is the elastic member. The beam is driven by vibrators of the type previously described mounted on each end.

In more detail, an H-frame member 64 has a pair of parallel cross beams 65 which cradle the free-free beam 62 on carrying rods 66 isolated from the cross beams 65 by rubber sleeves 68. These locations are the nodal points for the free-free beam and each carrying rod 66 serves as an air supply node for the adjacent vibrator 70 in the end. Air passages 72 in the beam 62 communicate with axial passages within the rods 66 and to a suitable air supply source not shown. Vibrators 70 are of the air driven roller-type and the operation is similar to that described with respect to the apparatus shown in FIGURE 1. In this case as before, the force impulses in the plane through the axes of the vibrators cancel out while the forces perpendicular thereto become synchronized and flex the ends of the beam 62 up and down when driven at a spin frequency approaching the resonant frequency of the system. The beam elastically responds to this motion by flexing at the center while remaining relatively motionless at the nodal points. For the 2000 c.p.s. system shown, diaphragm deflections of .006 inch are easily obtained.

Referring to FIGURE 7, it may be seen that the flexible diaphragm 60 is coupled at the center of the beam 62 by a rigid rod or transmission means generally indicated by the numeral 75. The flexible diaphragm 60 is pinched at the periphery between annular ribs formed on the plate 78 and at the bottom of reaction mass cylinder 61, the plate being threadably secured to the reaction mass and vibrationally considered as an integral part thereof. The reaction mass cylinder 61 has a central bore 80 closed at one end by the diaphragm 60 and is supported near the top in an isolated fashion from the beam 62 on support rods 82 mounted in the frame 64 and isolated by rubber sleeves 83.

Molten metal occupies the central bore 80 to a depth of several inches and may be heated in any suitable fashion. A sound field is developed in the molten metal which vibrates as a part of the vibratory system. The center of the free-free beam constitutes an antinodal point that deflects up and down causing the diaphragm 60 to vibrate and in turn cause the metal to pulsate as a part of the vibratory system. Obviously, the flexible diaphragm 60 is formed of a suitable material to withstand the fatigue and high temperatures encountered. The essential difference here over the apparatus shown in FIGURE 1 is that no crucible is vibrated as a part of the vibratory system.

Having now described the invention in considerable detail, it is anticipated that obvious variation thereof may be developed. Such changes are intended to be within the scope of the invention as defined by the appended claims.

I claim:

1. A vibratory apparatus for wetting an oxidized surface of the solid metal with a molten metal comprising
   a sonic wave generator,
   elastic coupling means interconnecting the sonic wave generator and the molten metal to form a vibratory system,
   a vessel for said molten metal, a portion of said vessel being rigidly connected to said coupling means at an antinodal point thereof,
   said generator being operable at a frequency and power sufficient to propagate standing acoustic waves in said elastic coupling means producing a sound field in the molten metal as the result of near maximum elastic deflections in the vibratory system at acceleration levels in excess of 100 times the acceleration of gravity whereby the oxide layer is disintegrated and dispersed by acoustically induced cavitation upon being immersed in the molten metal.

2. A vibratory apparatus for wetting an oxidized surface of a solid metal with a molten metal comprising, a sonic wave generator, elastic coupling means interconnecting the sonic wave generator and the molten metal to form a vibratory system, said elastic coupling means including a longitudinal column, vessel means rigidly mounted on one end of said column opposite the sonic wave generator, the molten metal occupying the vessel means as a part of the vibratory system and said column responding to periodic longitudinal impulses of the generator in a standing half-wave length vibrational pattern at a frequency in the region of a fundamental frequency of the system, and said generator being operable at a frequency and power sufficient to propagate standing acoustic waves in said longitudinal column producing a sound field in the molten metal as a result of near maximum elastic deflections in the vibratory system at acceleration levels in excess of 100 times the acceleration of gravity whereby the oxide layer on the solid metal is disintegrated and dispersed by acoustically induced cavitation upon being immersed in the molten metal.

3. A vibratory apparatus for wetting an oxidized surface of a solid metal with a molten metal comprising, a sonic wave generator, elastic coupling means interconnecting the sonic wave generator and the molten metal to form a vibratory system, said elastic coupling means including a flexural beam, vessel means vibrationally isolated from the beam and having a flexible wall portion rigidly connected to the beam, the molten metal occupying the vessel means and contacting said flexible wall portion thereby forming a part of the vibratory system and said beam responding to periodic transverse impulses by the generator in a standing wave acoustic vibrational pattern in which it locally bends back and forth elastically, the flexible wall being connected to the beam at an antinodal point thereof, and said generator being operable at a frequency and power sufficient to propagate standing acoustic waves in said flexural beam producing a sound field in the molten metal as the result of near maximum elastic deflections in the vibratory system at acceleration levels in excess of 100 times the acceleration of gravity whereby the oxide layer on the solid metal is disintegrated and dispersed by acoustically induced cavitation upon being immersed in the molten metal.

4. The apparatus of claim 2 wherein means are provided for resiliently supporting said longitudinal column in a vertical position.

5. The apparatus of claim 2 wherein said sonic wave generator comprises a pair of air-driven counter-rotating rollers supported for orbital movement about an annular track.

6. The apparatus of claim 3 wherein means are provided for supporting said flexural member at the nodal points thereof.

7. The apparatus of claim 3 wherein said sonic wave generator comprises a pair of air-driven counter-rotating rollers respectively supported at the opposite ends of said beam.

8. The apparatus of claim 3 wherein said vessel means is located above said beam and supported in a fixed position.

9. The apparatus of claim 3 wherein said vessel means is formed as a cylinder having the flexible wall supported near one end thereof in a plane normal to the longitudinal axis of the cylinder.

10. The apparatus of claim 3 wherein said flexible wall portion comprises a diaphragm peripherally supported by said vessel means.

11. The apparatus of claim 10 wherein a force transmission means connects the center of said diaphragm with an antinodal point of the flexural beam.

References Cited

UNITED STATES PATENTS

| | | | |
|---|---|---|---|
| 2,970,933 | 2/1961 | Barera et al. | 117—114 X |
| 3,158,886 | 12/1964 | Grimes | 118—103 X |

ROBERT W. JENKINS, *Primary Examiner.*